April 11, 1950
W. M. HOHNER
2,504,022
TOGGLE MECHANISM FOR WATER CONTROL
VALVES FOR TOILET FLUSH BOXES
Filed Dec. 31, 1946
2 Sheets-Sheet 1
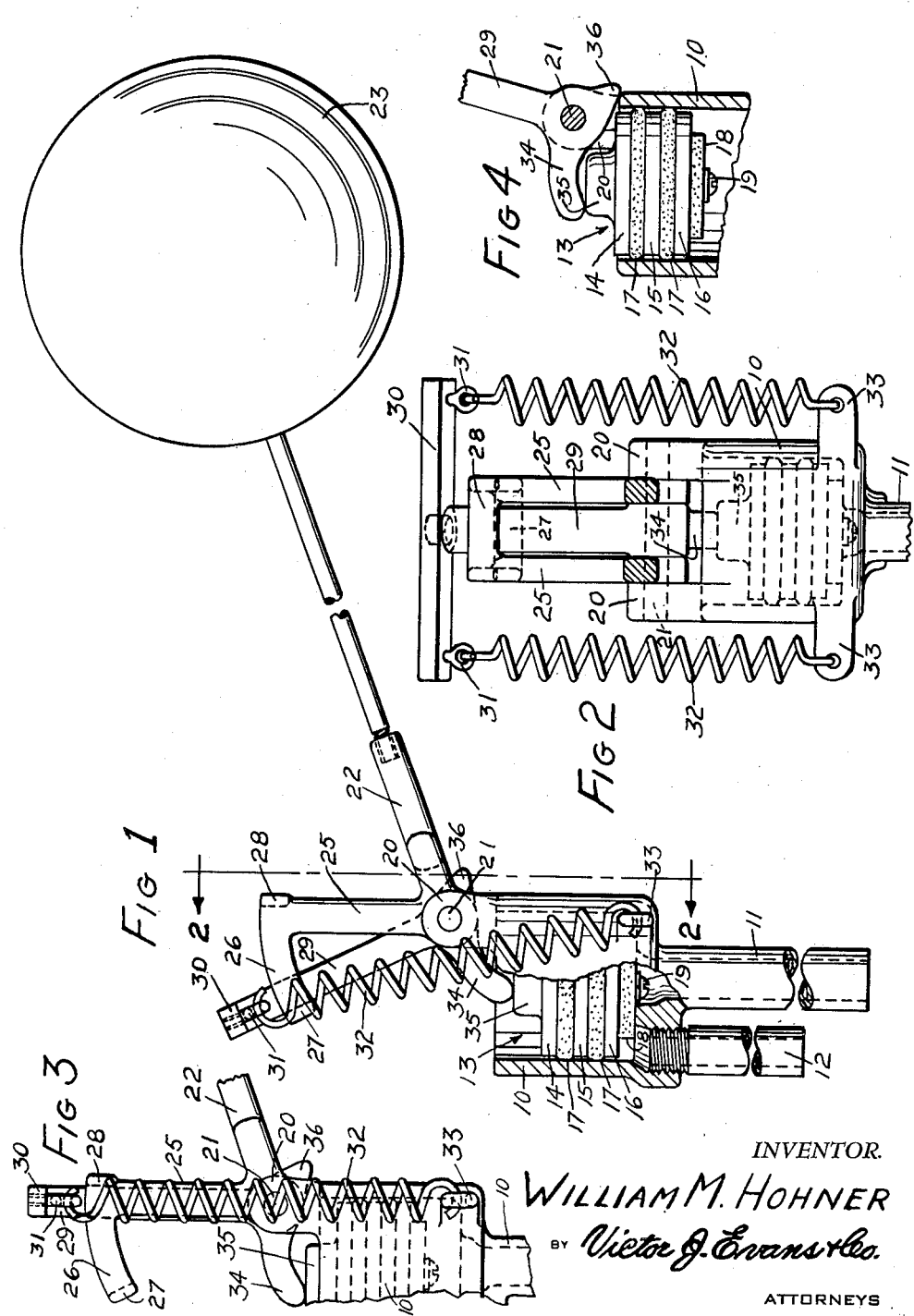
INVENTOR.
WILLIAM M. HOHNER
BY Victor J. Evans & Co.
ATTORNEYS

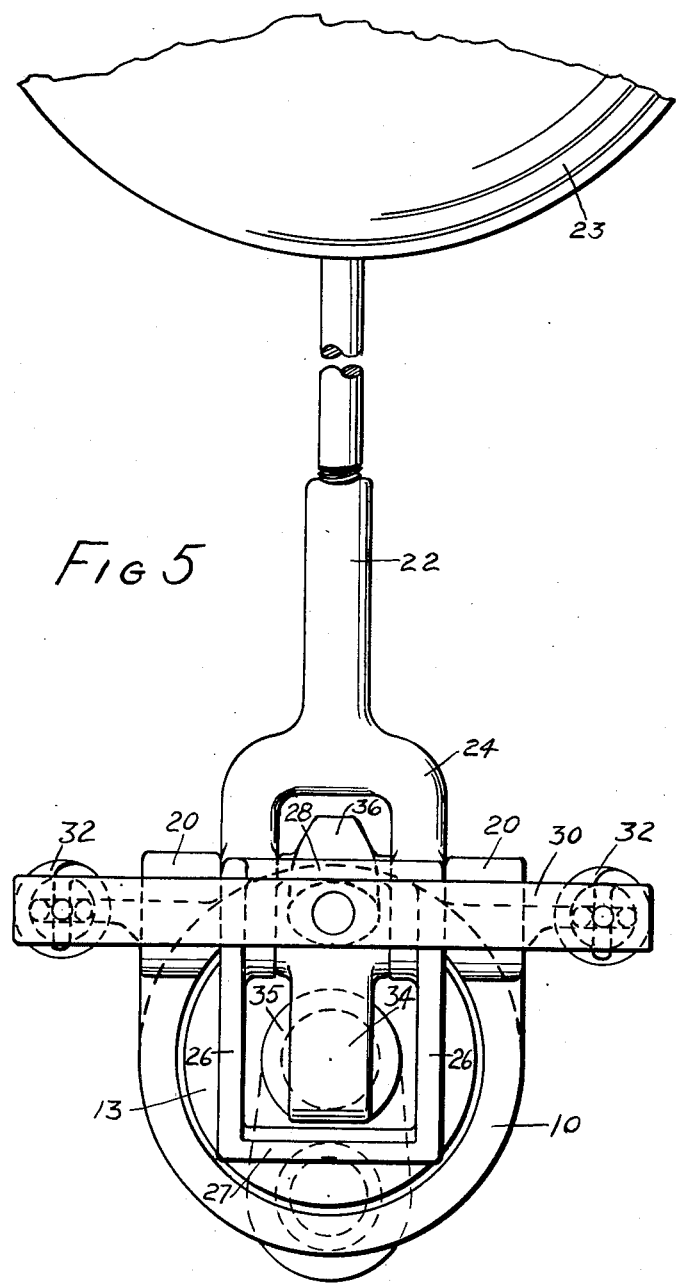

Patented Apr. 11, 1950

2,504,022

UNITED STATES PATENT OFFICE 2,504,022

TOGGLE MECHANISM FOR WATER CONTROL VALVES FOR TOILET FLUSH BOXES

William M. Hohner, Seattle, Wash.

Application December 31, 1946, Serial No. 719,589

1 Claim. (Cl. 74—97)

This invention relates to a toggle mechanism for a water control valve for a toilet flush tank.

An object of the invention is to provide a toggle mechanism of this type that will control the filling of the flush tank with a full flow and an instantly closing of the valve with which it is associated to shut off the flow thereto.

The principle of instant closure of the valve by means of the toggle mechanism is an advantage over the operation of the old type valve that is gradually closed, as the float connected thereto rises on the surface of the incoming water. This causes a wear on the valve seat if it isn't instantly closed, while the valve operation by the toggle mechanism embodying the invention being instantly closed, will prevent such wear and cutting of the valve seat.

With the above and other objects and advantages in view, the invention consists of the novel details of construction, arrangement and combination of parts more fully hereinafter described, claimed and illustrated in the accompanying drawings in which:

Figure 1 is a side elevational view, partly in section, of the valve embodying the invention in tripped position;

Figure 2 is a sectional view on the line 2—2 of Figure 1;

Figure 3 is a fragmentary detailed view of the valve just before tripping;

Figure 4 is a detailed fragmentary sectional view of the piston stopped to retain the piston in the cylinder and Figure 5 is a top plan view of the device.

Referring more in detail to the drawings, the reference numeral 10 designates the cylindrical cupped shaped open top valve body having the inlet pipe 11 formed integral therewith, and the outlet pipe 12 threadably connected thereto, both the inlet and outlet pipes being at the bottom of the valve body. Loosely mounted in the body 10 is the circular valve 13 on which is formed the upper annular ring 14, intermediate ring 15 and lower ring 16, a ring shaped packing 17 being seated intermediate the rings 14 and 15 and rings 15 and 16, and a disc packing 18 on the bottom of disc 16 closes the inlet pipe 11 and a screw 19 secures the packing 18 to the valve 13.

Extending upwardly from the body 10, in parallel relation to each other, are the bearings 20 in which is mounted the shaft 21 on which is pivotally mounted the float arm 22 for the float 23. The arm is pivoted with a bifurcated portion 24, which is mounted on the shaft 21 inwardly of and adjacent the bearings 20, and extending upwardly from the ends of the portion 24, are the parallel arms 25 having the downwardly curved ends 26 which are bridged by the cross bar 27, while the parallel arms 25 are bridged by the cross bar 28.

Mounted on shaft 21 in vertical relation thereto is the toggle arm 29, which is intermediate the cross bars 27 and 28, and has a cross bar 30 secured on the upper end thereof. Eyes 31 depend from each end of the bar 30, and have one end of a coil spring 32 adapted to each eye, while the other end thereof is attached to outwardly extending apertured arms 33 formed on the base of the body 10 on opposite sides thereof in alinement with each other.

The toggle arm 29 carries a cam 34 which engages the protuberance 35 on the valve 13, and a stop 36 rearwardly of and extending in the opposite direction to engage the body and prevent the valve from leaving the body during the operation thereof.

In operation, when the tank is empty, and as the water raises the float 23, the cross bar 28 will engage the toggle 29 and as the pressure increases on the float, the pressure on the toggle 29 will increase until the toggle is forced off center, and the cam will push the valve 13 downwardly to instantly shut off the water.

When the tank is emptied, the float 23 will settle with the water and the cross bar 27 will engage the toggle 29 and the weight of the koat plus the water pressure on the valve 13 will unseat the valve and allow water to enter the tank.

This full flow is permitted at all times with instant shut off of flow, eliminating wear on valve packings and providing longer life for the valve.

It is believed that from the foregoing description, the construction and operation of the invention will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A toggle mechanism for use with a movable part having a housing therefor, comprising a pair of bearing members, a shaft carried by said members, a forked arm member mounted on said shaft within said bearing members, a pair of parallel arms extending from the ends of said forked arms in angular relation thereto, curved parallel end portions formed on the upper ends of said parallel arms, a cross bar bridging the forward ends of said end portions, a second cross bar bridging the rear ends of said end portions, a toggle arm mounted on said shaft intermediate of said forked arm and adapted to extend outwardly of said shaft intermediate of said cross bars, a third cross bar carried by said toggle arm at its upper end, spring members fixed at one end at opposite ends of said third cross bar and at their other ends to said housing, a cam carried by one end of said toggle arm adapted to engage said moving part and a stop on the opposite end of the toggle arm adapted to engage said housing whereby when said toggle arm is moved off center, in one direction, the cam on said arm will engage said part for the moving thereof and when said toggle arm is moved off center in the opposite direction said stop will limit the movement of the part in the opposite direction.

WILLIAM M. HOHNER.

REFERENCES CITED

The following references are of record in the file of this patent:

UNITED STATES PATENTS

| Number | Name | Date |
| --- | --- | --- |
| 606,404 | Burnett | June 28, 1898 |
| 790,602 | Swendeman | May 23, 1905 |
| 1,312,678 | Brien | Aug. 12, 1919 |
| 2,171,620 | Bassett | Sept. 5, 1939 |
| 2,296,219 | Miller | Sept. 15, 1942 |
| 2,308,347 | Asselin | Jan. 12, 1943 |